United States Patent [19]

Van Berkel et al.

[11] Patent Number: 5,676,806
[45] Date of Patent: Oct. 14, 1997

[54] METHOD FOR APPLYING A CERMET ELECTRODE LAYER TO A SINTERED ELECTROLYTE AND ELECTROCHEMICAL REACTOR

[75] Inventors: Franciscus Petrus Felix Van Berkel; Jan Peter De Jong, both of Alkmaar; Jozef Peter Paul Huijsmans, Schoorl, all of Netherlands

[73] Assignee: Stichting Energieonderzoek Centrum Nederland, Petten, Netherlands

[21] Appl. No.: 446,830

[22] PCT Filed: Dec. 1, 1993

[86] PCT No.: PCT/NL93/00256

§ 371 Date: Jul. 31, 1995

§ 102(e) Date: Jul. 31, 1995

[87] PCT Pub. No.: WO94/13027

PCT Pub. Date: Jun. 9, 1994

[30] Foreign Application Priority Data

Dec. 1, 1992 [NL] Netherlands ............................ 9202087

[51] Int. Cl.$^6$ ............................ C25B 9/00; C25B 11/04; B05D 5/12
[52] U.S. Cl. .................. 204/242; 427/126.3; 427/126.5; 427/126.6
[58] Field of Search ............................ 427/126.3, 126.5, 427/126.6; 204/242

[56] References Cited

U.S. PATENT DOCUMENTS

| | | | |
|---|---|---|---|
| 3,085,876 | 4/1963 | Alexander et al. | 419/19 |
| 3,300,344 | 1/1967 | Bray et al. | 429/33 |
| 4,283,441 | 8/1981 | Haecker et al. | 204/424 X |
| 4,700,169 | 10/1987 | Tanno | 427/126.6 X |
| 4,725,346 | 2/1988 | Joshi | 204/242 |
| 5,143,751 | 9/1992 | Richards et al. | 427/126.3 |

FOREIGN PATENT DOCUMENTS

| | | |
|---|---|---|
| 28 52 638 | 6/1980 | Germany . |
| 42 29 553 | 3/1992 | Germany . |
| 41 32 584 | 4/1992 | Germany . |

OTHER PUBLICATIONS

T. Kawada et al., "Characteristics of Slurry–Coastel Nickel Zirconia Cermet Anodes for Solid Oxide Fuel Cells", *Journal of the Electrochemical Society*, vol. 137, No. 10, Oct. 1990, pp. 3042–3047.

T. Setoguchi et al., "Effects of anode Material and Fuel on anodic Reaction of Solid Oxide Fuel Cells", *Journal of the Electrochemical Society*, vol. 139, No. 10, Oct. 1992, pp. 2875–2880.

T. Kawada et al., "Structure and Polarization Characteristics of Solid Oxide Fuel Cells Anodes", *Solid State Ionics*, vol. 40/41, 1990, pp. 402–406.

D.W. Dees et al., "Conductivity of Porous Ni/ZrO$_2$–Y$_2$O$_3$ Cermets", *Journal of the Electrochemical Society*, vol. 134, No. 9, Sep. 1987, pp. 2141–2146.

S. Murakami et al., "Development of a Solid Oxide Fuel Cell With Composite Anodes", pp. 561–568 No Date Available.

*Primary Examiner*—Donald R. Valentine
*Attorney, Agent, or Firm*—Young & Thompson

[57] ABSTRACT

The invention relates to a method for applying a cermet electrode layer to a sintered electrolyte. This layer consists of a mixture of an ion-conducting oxide and a semiprecious metal oxide or precious metal oxide. According to the invention, the ion-conducting oxide is calcined without the presence of the (semi)precious metal oxide in order to provide for lateral electron conductivity, while the sintering of the mixture of the electrolyte takes place at as low a temperature as possible.

7 Claims, 1 Drawing Sheet

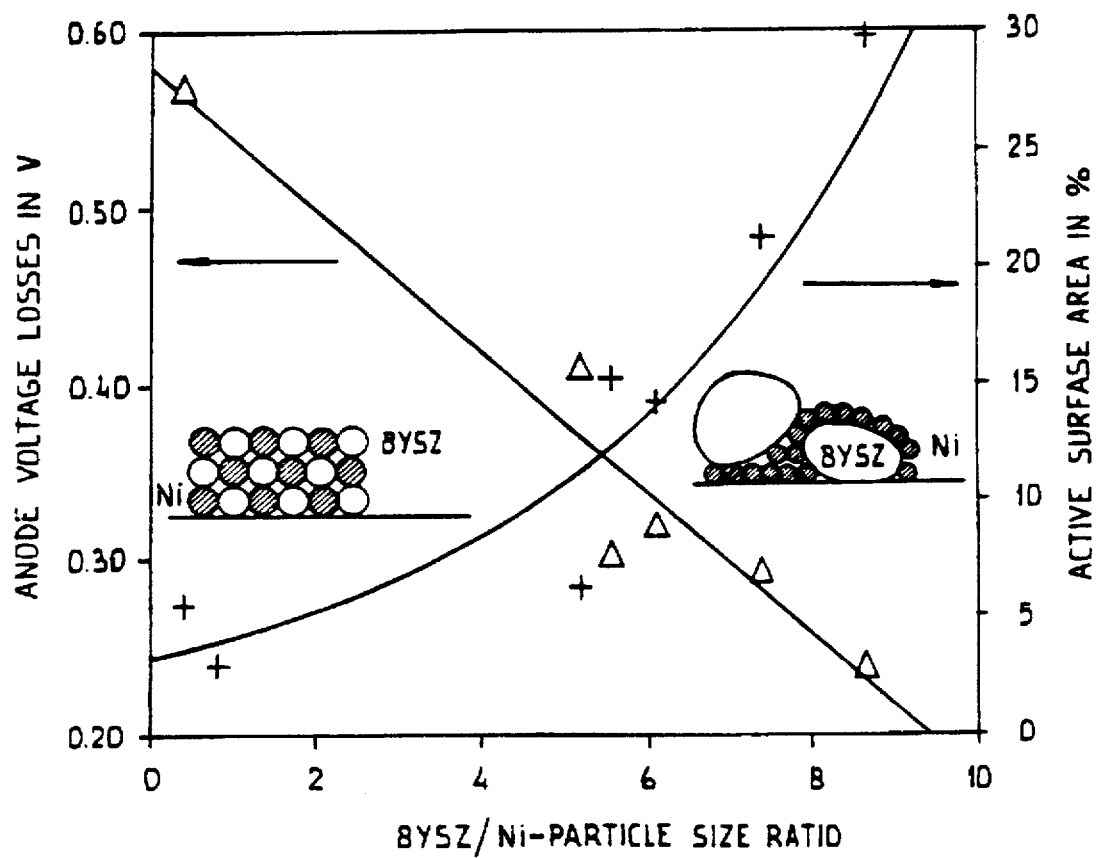

METHOD FOR APPLYING A CERMET ELECTRODE LAYER TO A SINTERED ELECTROLYTE AND ELECTROCHEMICAL REACTOR

The present invention relates to a method according to the precharacterizing clause of claim 1.

A method of this type, followed by the reduction of the metal oxides to the metal is employed for fabricating electrodes in electrochemical reactors. An example of this is given in the article "Characteristics of Slurry-Coated Nickel Zirconia Cermet Anodes for Solid Oxide Fuel Cells" by Tasuya Kawada et. al. in J. Electrochem. Soc., Vol. 137, No. 10, October 1990, pp. 3042–3047. In this case, the metal oxide employed was nickel oxide, and the oxygen ion-conducting oxide employed was yttrium-stabilized zirconium oxide (YSZ). A mixture of nickel oxide and YSZ is calcined after mixing, is applied to the electrolyte in the form of a slurry and is then sintered, a reduction treatment finally taking place to convert the metal oxide into metal.

For electrodes of this type, which are used, in particular, as plate anodes in solid-oxide fuel cells, the lateral electron conduction is important, in order to be able to take off current. Moreover, in connection with promoting the electrochemical reaction, a high catalytical activity is important. Because fuel cells of this type are generally operated at an elevated temperature (from 800° C.), it is important that the coefficient of expansion of the layer and of the electrolyte which serves as the support of the anode are approximately equal in order to avoid, as far as possible, thermal stresses during the heating and cooling cycles. Finally it is important that no shrinkage arises during sintering.

The method described in the abovementioned publication by Kawada is particularly suitable for fabricating small electrode. However, when aiming for putting larger-scale fuel cells into practice, it is important likewise to be able to coat in this manner electrolytes having a larger surface area. It was found that, when an electrolyte having a larger surface area was coated in this manner, problems arose as a result of the considerable sintering shrinkage during sintering and of the lack of lateral conductance after reduction, so that the electrode thus fabricated will fail.

The German Offenlegungsschrift 2,852,638 discloses a method according to the precharacterizing clause of claim 1. The starting point for the sensors fabricated according to that patent specification is formed by metals or semiprecious metals. According to this German Offenlegungsschrift, a relatively high sintering temperature is employed. The properties required of gas sensors are completely different from the demands made of electrochemical cells. In the case of a gas sensor, the determination of an electromotoric force between the gas to be analysed and a reference gas is the only thing that matters. In an electrochemical cell, the electrodes must be suitable for high current densities in order to produce a sufficient output. In order to achieve such a high current density, relatively coarse ion-conducting oxides should be present and the metal or precious-metal particles should be as small as possible.

The object of the present invention is to provide a method by which it is possible to eliminate the drawbacks existing for gas sensors for use in electrochemical cells. This object is achieved in a method described hereinabove having the characterizing features of claim 1.

It has been found that it is possible, by precalcining the ion-conducting oxide, to adjust, independently of the metal oxide, the particle size thereof. The higher the precalcination temperature, the larger the particle size. By starting from oxides of precious metals or semiprecious metals, simpler grinding is possible. The lower sintering temperature, compared to the prior art, prevents the oxide particles, after sintering, from adhering to one another in such a way that after reduction lateral conductance is no longer possible.

The ion-conducting oxide may be a member of the crystal structure class of the perovskites and fluorites which can be formed from the transition metals, the rare earth metals and the alkaline earth metals. In the case of the fluorites it is possible, in particular, to opt for zirconia, ceria and hafnia, doped with trivalent rare earth metal ions or divalent alkaline earth metal ions. In the case of the perovskites, ion-conducting cerates or zirconates may be chosen.

Preferably, the ion-conducting oxide comprises the yttrium oxide-stabilized zirconium oxide, and the (semi) precious metal oxide comprises nickel oxide, the zirconium oxide preferably being stabilized by means of 8 mol % of yttrium oxide. The calcination temperature for the YSZ in such an embodiment is preferably between 1250° and 1600° C., and the sintering temperature between 1200° and 1300° C.

The invention also relates to an anode for a solid oxide fuel cell, comprising an electrolyte which has been coated in the abovementioned manner with a layer of material and in which the metal oxide has been converted into metal by reduction.

The invention will be explained below in more detail with reference to an example.

For the purpose of preparing an anode of a fuel cell, an electrolyte consisting of a densely sintered ceramic material was coated with a slurry comprising NiO/8 mol % $Y_2O_3$-stabilized $ZrO_2$. After reduction, 55% by volume of nickel was present, but it should be understood that the nickel percentage can be chosen over a wide range between approximately 30 and 70% by volume. The slurry was produced by mixing nickel oxide powder with precalcined yttrium oxide-stabilized zirconium oxide. This mixing took place in a ball mill device, in a solution of binder. This slurry was then cast onto the electrolyte, by means of the so called "tape casting" technique, and the anode from the electrolyte was sintered in air. Reduction then took place. Calcining of the YSZ took place independently (thus without the presence of NiO). Tests showed that, depending on the calcination temperature, the particle size of the YSZ changed:

TABLE 1

Average particle size of 8YSZ was a function of the calcination temperature and the average particle size of Ni as a function of the sintering temperature.

| Tape code $T_{pc}T_s$ | 8YSZ particle size (μm) | Ni particle size (μm) | 8YSZ/Ni particle size ratio |
|---|---|---|---|
| 1250/1200 | 0.48 | 1.2 | 0.4 |
| 1400/1300 | 17.8 | 2.4 | 7.4 |
| 1400/1400 | 17.8 | 3.2 | 5.5 |
| 1500/1200 | 10.4 | 1.2 | 8.7 |
| 1500/1300 | 10.4 | 1.7 | 6.1 |
| 1500/1400 | 10.4 | 2.0 | 5.2 |

$T_{pc}$ = Precalcination temperature; $T_s$ = Sintering temperature.

The particle size of the nickel oxide, measured under the same conditions, was found to be 1–2 μm.

The mixture, consisting of nickel oxide and YSZ, applied to the electrolyte, was then sintered at various sintering temperatures. The sintering temperatures were 1200°, 1300°, 1400° and 1500° C.

The lateral electron conductivity was measured of the product formed, this being, as specified hereinabove, an important parameter for determining whether an electrode is satisfactory or not. This lateral electron conductance was measured at 950° C., employing a so-called "four-probe" method which is described in more detail in L. Plomp, A. Booy, J. A. M. van Roosmalen and E. H. Pl. Cordfunke, Rev. Sci. Instrum. 61, 1949 (1990).

The following results were observed:

TABLE 2

| $T_c/T_{sinter}$ | 1200 | 1300 | 1400 | 1500 |
|---|---|---|---|---|
| — as received | – | – | – | – |
| 1250 | +/– | + | + | – |
| 1400 | + | + | + | – |
| 1550 | + | + | + | – |

– = lateral electron conductance absent
+ = lateral electron conductance present This table shows that good results are obtained if a relatively high calcination temperature and a relatively low sintering temperature is employed.

Comparison with Table 1 shows that, for the lateral electron conductance, it is likewise important to use YSZ particles having an average grain size greater than 1 μm. This could be explained with reference to the percolation theory, but it should be understood that the validity or otherwise of this theory does not affect the scope of protection of this application. This table shows, moreover, that no lateral electron conductance takes place above 1400° C.

Then the effect of the calcination temperature and the sintering temperature on the anode potential was determined with the aid of the "three-electrode" method. This involves measuring the voltage loss over the anode (effective electrode area of 3 cm$^2$) measured at a current density of 100 mA/cm$^2$ and an operating temperature of 920° C. The results of this test are depicted in Table 3.

TABLE 3

| Tapecode $T_{pc}/T_s$ | 8YSZ/Ni-particle size ratio | $R_b$ (Ohm) | $A_{ca}$ (%) | Anode losses (mV) at 100 mA/cm$^2$ and 920° C. |
|---|---|---|---|---|
| 1250/1200 | 0.4 | 0.662 | 5.5 | 570 |
| 1400/1300 | 7.4 | 0.172 | 21.3 | 294 |
| 1400/1400 | 5.5 | 0.2403 | 15.3 | 303 |
| 1500/1200 | 8.7 | 0.1233 | 29.7 | 240 |
| 1500/1300 | 6.1 | 0.2556 | 14.3 | 321 |
| 1500/1400 | 5.2 | 0.5758 | 6.3 | 411 |

$T_{pc}$ = Precalcination temperature; $T_s$ = Sintering temperature;
$R_b$ = Measured electrolyte resistance;
$A_{ca}$ = Effective cross-sectional area.

Table 3 shows that the highest calcination temperature for YSZ and the lowest sintering temperature give an anode having the lowest voltage loss of the electrode. It is true, moreover, that an electrode of this type has the best shrinkage behaviour, i.e. the lowest sintering shrinkage during production.

Finally, the same method was used to determine the impedance from the electrode-electrolyte interface by means of a "Solartron 1255 frequency response analyser". Using a theoretical mode, it is possible to determine, from these impedance data, the effective electrolyte surface area covered by active anode sites. The contribution of the electrode impedance and the electrolyte impedance can be separated in the impedance spectrum. In general, the measured value of the electrolyte resistance R(B) does not agree with the expected (theoretical) value of the electrolyte resistance. This can, in part, be explained by the fact that a small fraction of the electrolyte surface area contributes to the conductivity, i.e. only that part which is covered by Ni particles from the anode microstructure. With the aid of the formula:

$$A = \rho_B * T_B / R_B \quad [1]$$

the apparent or active electrolyte surface area can be calculated as a fraction of the total electrolyte surface area. In this formula, A is the active surface area, $T_B$ is the thickness of the electrolyte, $R_B$ is the measured electrolyte resistance and $\rho_B$ the resistivity of the electrolyte at 930° C. In Table 3, the $A_{CS}$ values (as a fraction of the total electrolyte surface area) are given as a function of the precalcination temperature and the sintering temperature. The $A_{CS}$ values were determined for the number of active sites on the interface anode/electrolyte.

From Table 3 it is likewise possible to conclude that the anodes with the highest precalcination temperature and the lowest sintering temperature give the best results.

The only FIGURE depicts the effect of the ratio of the particle size on the loss in anode voltage. This FIGURE also depicts the mutual relationship of Ni and 8 YSZ.

Although the invention has been described hereinabove with reference to a preferred embodiment, it should be understood that numerous modifications are possible thereof without leaving the scope of protection of the present invention as it is described in the claims.

We claim:

1. Method for applying a cermet electrode layer to a sintered electrolyte, which layer at least comprises an oxide (A) of a semiprecious metal or precious metal and an oxide (B) which conducts ions, in which method a slurry is formed of (A) and (B), the slurry is applied to the electrolyte and the coated electrolyte is sintered, wherein (B) is calcined at a temperature between 1250° C. and 1600° C. prior to the slurry being formed with (A), the particle size of (B) becoming greater than that of (A), the sintering being carried out at a temperature between 1200° and 1300° C., and wherein, after sintering, the electrolyte provided with a layer is subjected to a reducing treatment in order to convert (A) into metal.

2. Method according to claim 1, wherein (B) is chosen from ion-conducting oxides in the crystal structure class of the fluorites and perovskites, it being possible to use, in the case of the fluorites, zirconia, ceria and hafnia, doped with trivalent rare earth metal ions or divalent alkaline earth metal ions, and, in the case of the perovskites, ion-conducting cerates or zirconates.

3. Method according to claim 1, wherein the metal of (B) is chosen from copper, nickel, cobalt, silver, gold, platinum, palladium, rhodium or ruthenium, iridium.

4. Method according to claim 1, wherein (B) is yttrium oxide-stabilized zirconium oxide (YSZ) and (A) is nickel oxide.

5. Method according to claim 4, wherein the layer applied to the electrolyte comprises nickel, as well as zirconium oxide stabilized with 8 mol % of yttrium oxide (YSZ).

6. Method according to claim 5, wherein the calcination temperature is approximately 1500° C.

7. A ceramic electrochemical reactor comprising a sintered electrolyte having a cermet electrode layer having therein an oxide that conducts ions, the layer being produced by the method of claim 1.

* * * * *